ated Kraft black liquor with a sodium lignosulfonate solution containing sodium hydroxide. In addition this solution may also contain a low molecular weight polyacrylate.

United States Patent [19]
Gossage

[11] 3,966,698
[45] June 29, 1976

[54] RECOVERY OF TALL OIL SOAPS
[75] Inventor: Robert V. Gossage, Chicago Ridge, Ill.
[73] Assignee: Nalco Chemical Company, Oak Brook, Ill.
[22] Filed: May 2, 1975
[21] Appl. No.: 574,077

[52] U.S. Cl. .......................... 260/97.5; 252/8.5 C; 260/97.7; 260/124 A
[51] Int. Cl.² .......................................... C09F 1/00
[58] Field of Search ............. 260/97.5, 124 A, 97.7; 252/8.5 C

[56] References Cited
UNITED STATES PATENTS

| 3,340,188 | 9/1967 | Barrett | 260/97.5 |
| 3,578,628 | 5/1911 | Chun | 260/97.5 |
| 3,686,119 | 8/1972 | Markham | 260/124 A |

Primary Examiner—Lewis T. Jacobs
Assistant Examiner—William Parker
Attorney, Agent, or Firm—John G. Premo; Robert A. Miller; Barry W. Sufrin

[57] ABSTRACT

A method for increasing the yield of tall oil soaps from Kraft black liquor in the manufacture of paper pulp by treating the Kraft black liquor with a sodium lignosulfonate solution containing sodium hydroxide. In addition this solution may also contain a low molecular weight polyacrylate.

22 Claims, No Drawings

RECOVERY OF TALL OIL SOAPS

In the process for the manufacture of paper pulp, the digesting and washing of raw wood produces a so-called "Kraft black liquor" which contains processing chemicals and certain materials from the wood. This kraft black liquor contains both solid and dissolved materials such that the liquor is usually from 12 to 15% solids. This solid portion contains about 1 to 8% by weight of tall oil soaps. Usually, the soaps range from 1 to 6% by weight, preferably from 1 to 4%. These tall oil soaps are primarily fatty acids and rosin acids.

Also in the past few years, the availability of tall oil soaps has declined and as a result the price has risen by as much as 40 to 50%. In these periods of scarcities and shortages, there is a trend towards maximizing the efforts for recovery of tall oil soaps.

Tall oil soaps are the cheapest known source of fatty acids. Tall oil competes with fatty acids from soybeans and cottonseed. As mentioned above, it is so important commercially that its recovery from kraft black liquor is now an economic necessity. In fact, the recovery of 60 lbs. of tall oil soap/ton of pulp reduces a mill's wood costs and produces a savings of approximately 12% on wood costs.

It is customary to remove the greatest portion of tall oil soaps from the Kraft black liquor during the pulp mill evaporation operation. The recovery of tall oil soaps can influence two aspects of the evaporation operation. It can affect the time between boilouts and the frequency of evaporation upsets. Both of these factors directly affect a pulp mill's productivity, soda losses and contribution to stream pollution as well as energy savings. In other words, good tall oil soap removal means good evaporator performance.

Typically, tall oil soaps have been removed from Kraft black liquor by skimming off the surface solids from the Kraft black liquor in a skimming tank. However, this technique has proved to be ineffective, in that, not all of the tall oil soaps were removed. This resulted in substantial waste in view of the lost tall oil soap as well as the descrease in efficiency of the evaporation operation.

The black liquor is preconcentrated before the skimmer through evaporation to an optimum range of 23 to 28% solids. 21 to 32% are usually outer limits in mills. Solids are raised by evaporation through the first 2 to 3 effects. Some mills also "sweeten" the liquor by adding high solids liquor from some of the later effects.

It would be desirable to provide an agent to help agglomerate and insolubilize the tall oil soap prior to the skimming operation such that the yield of tall oil soap separated from the Kraft black liquor could be increased.

OBJECTS

It is therefore an object of this invention to provide a method for agglomerating and insolubilizing tall oil soaps present in Kraft black liquor prior to and during skimming.

It is also an object of this invention to provide a method for agglomerating and insolubilizing tall oil soaps present in Kraft black liquor so that the yield of tall oil soap recovered by skimming is substantially increased.

It is a further object of this invention to provide a method for improved efficiency in the evaporation operation in the manufacture of paper pulp.

It is a still further object of this invention to reduce the waste of tall oil soaps in the manufacture of paper pulp.

Other objects will appear hereafter and will be evident to those skilled in the art.

THE INVENTION

This invention provides a method for the separation of tall oil soaps from Kraft black liquor in the manufacture of paper pulp. The Kraft black liquor is treated with an aqueous solution of sodium lignosulfonate containing sodium hydroxide. In addition, this solution may also contain a low molecular weight polyacrylate. Typically, the aqueous solution of sodium lignosulfonate is added to the Kraft black liquor as it is passing into the skimmer. This procedure helps to agglomerate and insolubilize the tall oil soaps so that they are easily removed by the skimmer. The soaps float more quickly to the top of the skimmer.

Therefore, this invention is a method for the separation of tall oil soaps from Kraft black liquor in the manufacture of paper pulp which comprises the steps of: (1) Treating the Kraft black liquor with an aqueous solution of sodium lignosulfonate containing sodium hydroxide; (2) Rendering the tall oil soaps insoluble; and (3) Removing the tall oil soaps by skimming.

The second step of rendering the tall oil soaps insoluble is usually accomplished by thoroughly mixing in the aqueous solution with the black liquor.

The solution used in the practice of this invention has a composition of 10 to 50% by weight of sodium lignosulfonate, 1 to 20% sodium hydroxide and 40 to 75% of water. A preferred composition has 40% sodium lignosulfonate, 10% sodium hydroxide, and 50% water. All percentages are by weight of the solution.

Also, it has been discovered that the addition of a small amount of a low molecular weight polyacrylate helps to further improve the separation of tall oil soaps from Kraft black liquor. These compositions consist of 10 to 40% by weight of sodium lignosulfonate, 1 to 20% by weight of sodium hydroxide, 1 to 15% by weight of a low molecular weight polyacrylate and 25 to 80% by weight of water. A preferred composition has 30% by weight of sodium lignosulfonate, 5% by weight of sodium hydroxide, 6% by weight of a low molecular weight polyacrylate and 59% of water.

The solutions used in the practice of this invention are added to the Kraft black liquor in concentration of 5 to 1000 ppm, with the preferred concentration being 25 to 200 ppm.

The preferred low molecular weight polyacrylates used in this invention generally have a molecular weight within the range of from 5,000 to 20,000. However, depending on the type of polyacrylate, the molecular weight of the polymer may even be outside this range. A preferred molecular weight is 5,000 to 10,000. The polyacrylates that have been found to be most useful in this invention include homopolymers of acrylic acid or methacrylic acid or copolymers of acrylic and methacrylic acid. A preferred copolymer is a copolymer of acrylic acid and methacrylic acid. It has been found that a molar ratio of acrylic acid to methacrylic acid of 5:1 to 1:5 provides an active polymer for this process. A preferred molar ratio of acrylic acid to methacrylic acid is 3:1.

Such polymers may be used in either dry polymer form of an aqueous solution. These solutions are stable.

The present invention is further illustrated by the following examples:

EXAMPLE I

To a 500 ml. glass reaction vessel was added 36.48 grams of water, 14.99 grams of acrylic acid, 5.83 grams of methacrylic acid and 1.67 grams of thioglycolic acid. The reaction vessel was fitted with a thermometer, electric driven stirrer and an addition funnel. Also, the reaction vessel was fitted with a cooling jacket. Full cooling was maintained so as to keep the temperature range from 15° to 25°C. After the reactants were stirred for about 10 minutes within the temperature range mentioned above, 1.17 grams of ammonium persulfate dissolved in 7.33 grams of water was added quickly to the reaction vessel. Mixing was continued and shortly thereafter a strong exotherm was observed. This continued for a period of 1 to 4 minutes. After an additional 3 to 8 minutes the polymerization was complete and the temperature of the vessel was reduced to 25° to 35°C. Then 11.70 grams of a 50% sodium hydroxide was added to the reaction vessel to neutralize the polymer product. The reaction vessel was stirred for an additional 30 minutes. The liquid containing the dissolved polymer product can be used as is, or it can be recovered as a dry polymer. For the following examples, the aqueous liquid contaning the polymer was used. This solution contains about 30% by weight of the polymer.

Solutions were prepared for testing the plant separation of tall oil soaps from Kraft black liquor in the manufacture of paper pulp. The solutions were prepared as follows:

EXAMPLE 2

40% sodium lignosulfonate
10% sodium hydroxide
50% water

EXAMPLE 3

30% sodium lignosulfonate
5% sodium hydroxide
20% of solution containing polymer in Example 1
45% water Note: All percentages are by weight of solution.

EXAMPLE 4

Listed below is a field procedure used for measuring the amount of tall oil in Kraft black liquor in the manufacture of paper pulp. This procedure was used in the testing that was performed in the following examples.

Procedure:

1. The Kraft black liquor samples are equally diluted with deionized water to a solids level of 5 to 7%. Mix well to dissolve all tall oil soaps.

2. Obtain the solids content by drying 10.0 ml of dilute Kraft black liquor in a tared dish at 105°C.

3. Pipet 25.0 ml. of dilute Kraft black liquor into a 250 ml. separatory funnel.

4. Add 2.0 mls. of a 20% $H_2O_2$ solution, and swirl vigorously for 45 seconds. Within one minute after the $H_2O_2$ addition, add 2 mls. of a 20% $Na_2SO_3$ solution. Swirl vigorously for one minute.

5. Add 5 mls. of a hydrochloric acid solution (50:50 concentrated HCl with deionized water) and shake for one minute with periodic venting to release pressure.

6. Add 65 mls. of a 3:10 acetone/methanol solution and mix thoroughly to dissolve the lignins. Also vent frequently to help release the pressure that develops during this step.

7. Add 40 mls. of petroleum ether and shake for 3 minutes. Again vent frequently as described above. After shaking, allow at least 5 minutes for phase separation.

8. Discard lower lignin layer. Wash petroleum ether phase in a 250 ml. separatory funnel twice with 15 mls. portions of a 2:1:1 acetone/water/methanol solution. Again vent frequently to help release the pressure. Discard the lower phase of each wash.

9. Quantitatively transfer the petroleum ether phase into a 125 ml. Erlenmeyer flask.

10. Add 1 ml. of phenolphthalein solution. The addition of 3 mls. of 100% isopropyl alcohol will give a clear end point.

11. Titrate the sample with 0.05 N alcoholic KOH solution. The endpoint is taken at the point where the first pink color persists for 30 seconds.

12. Assuming an acid number of 172, the weight of tall oil is calculated as follows:

$$\text{weight of tall oil/gms.} = \frac{(\text{ml. of KOH}) (56.1) (\text{Normality of KOH})}{172}$$

13. Calculate the percent of tall oil on a liquor solids basis using the weight of tall oil calculated above:

$$\% \text{ tall oil on solids basis} = \frac{(\text{weight of tall oil/gms.}) \, 40}{\text{gms. solids in 10.0 ml. dilute Kraft black liquor}}$$

EXAMPLE 5

At a Kraft mill located in the southern section of the United States a trial was conducted on a set of evaporators with a tall oil soap skimmer operating from it. The Kraft black liquor had approximately 25% solids and a flow rate of 640 to 670 gallons/minute. It consisted primarily of pine and hardwood liquors. Because of the high flow rate, the liquor turnover time in the skimmer was less than thirty minutes. Initial testing indicated a 20% efficiency in tall oil soap recovery. The apparatus consisted of a large holding tank with an inlet and outlet near the bottom. As the tall oil soap separated from the Kraft liquor and floated up to the soap-liquor interface, it rose up and over the edge of a three foot diameter funnel. The soap runs down the connecting pipe into a soap holding tank. There the black liquor settles to the bottom and is sent back into the evaporators. The tall oil soap is then pumped into another holding tank to await acidulation. It is shown below that by treating the Kraft black liquor prior to the skimmer, the efficiency of the mill's tall oil soap recovery system is increased.

Several untreated Kraft liquor samples were taken, and then the feeding of the aqueous solution prepared in Example 2 was fed at 100 ppm based on the flow of approximately 650 gal/minute. After 4½ hours, another set of samples were taken and the treatment stopped. The samples were analyzed and the results are provided below:

| Sample | Source | % Tall Oil Based on Liquor Solids | Efficiency of Skimmer | Treatment |
|---|---|---|---|---|
| 1 | In Skimmer | 1.203 | | None |
| 2 | Out Skimmer | .960 | 20.2% | |
| 3 | In Skimmer | 1.369 | | 100 ppm Example II Feed |
| 4 | Out Skimmer | .504 | 63.2% | |

These results show an increase in tall oil recovery from 20.2% to 63.2% as a result of the composition of Example II addition.

EXAMPLE 6

Additional testing work was performed at the plant described in Example 3 for a number of days. The results are provided in the table below:

TABLE I

| Day | Time | Treatment | Sample Location | Wt. g/5 ml. | Tall Oil Soap/25 ml. | % Tall Oil | Skimmer Efficiency |
|---|---|---|---|---|---|---|---|
| 1 | 10:30 | None | To Skimmer | .3608 | .0217 | 1.203 | |
| | '' | | From Skimmer | .3523 | .0169 | .959 | 20.3% |
| 2 | 10:50 | None | To Skimmer | .3831 | .0265 | 1.383 | |
| | | | From Skimmer | .3774 | .0204 | 1.081 | 21.8% |
| 2 | 12:45 | 100 ppm Ex. 2 | To Skimmer | .3664 | .0329 | 1.796 | |
| | '' | '' | From Skimmer | .3951 | .0198 | 1.002 | 44.2% |
| 2 | 3:30 | '' | To Skimmer | .3340 | .0229 | 1.371 | |
| | '' | '' | From Skimmer | .3485 | .0088 | 0.504 | 63.2% |
| 3 | 11:00 | None | To Skimmer | .6238 | .0337 | 1.080 | |
| | '' | '' | From Skimmer | .4900 | .0196 | .800 | 25.9% |
| 3 | 1:00 | 100 ppm Ex. 2 | To Skimmer | .6025 | .0364 | 1.208 | |
| | '' | '' | From Skimmer | .5201 | .0209 | .804 | 33.4% |
| 3 | 2:00 | '' | To Skimmer | .4640 | .0360 | 1.552 | |
| | '' | '' | From Skimmer | .4903 | .0214 | .873 | 43.8% |
| 3 | 3:00 | '' | To Skimmer | .7109 | .0308 | .867 | |
| | '' | '' | From Skimmer | .6872 | .0153 | .445 | 48.7% |
| 3 | 4:00 | None | To Skimmer | .6675 | .0395 | 1.184 | |
| | | | From Skimmer | .5909 | .0215 | .728 | 38.5% |
| 4 | 8:00 | None | To Skimmer | .6758 | .0230 | .681 | * |
| | | | From Skimmer | .6122 | .0242 | .791 | |
| 4 | 10:00 | 100 ppm Ex. 3 | To Skimmer | .6619 | .0239 | .722 | |
| | '' | | From Skimmer | .5891 | .0133 | .452 | 37.4% |
| 4 | 12:00 | '' | To Skimmer | .6907 | .0331 | .958 | |
| | | '' | From Skimmer | .6070 | .0206 | .679 | 29.1% |
| 4 | 2:00 | '' | To Skimmer | .6661 | .0296 | .889 | |
| | | '' | From Skimmer | .5959 | .0144 | .483 | 49.0% |
| 4 | 4:00 | None | To Skimmer | .6953 | .0337 | .969 | |
| | | None | From Skimmer | .5911 | .0202 | .683 | 29.5% |
| 5 | 8:00 | None | To Skimmer | .3725 | .0251 | 1.348 | |
| | | None | From Skimmer | .4435 | .0122 | .550 | 59.2% |
| 5 | 10:00 | 100 ppm Ex. 2 | To Skimmer | .3965 | .0292 | 1.473 | |
| | | '' | From Skimmer | .4295 | .0103 | .480 | 67.4%* |
| 5 | 11:00 | '' | To Skimmer | .4290 | .0297 | 1.385 | |
| | | '' | From Skimmer | .5290 | .0156 | .590 | 57.4% |
| 5 | 12:00 | '' | To Skimmer | .5420 | .0331 | 1.221 | |
| | | '' | From Skimmer | .4625 | .0111 | .480 | 60.7% |
| 5 | 2:00 | '' | To Skimmer | .5095 | .0326 | 1.280 | |
| | | '' | From Skimmer | .4085 | .0098 | .480 | 62.2% |
| 5 | 3:00 | None | To Skimmer | .4055 | .0307 | 1.514 | |
| | | None | From Skimmer | .4025 | .0109 | .542 | 64.2% |
| 5 | 4:00 | None | To Skimmer | .4275 | .0362 | 1.694 | |
| | | None | From Skimmer | .4540 | .0132 | .581 | 65.7% |

*Incomplete or in error due to faulty sampling techniques or procedures.

In the results listed in the Table, the feed was begun immediately after the previous sample for no treatment was taken. Also, to obtain the results when there was no treatment, the feed was discontinued immediately after the sample showing treatment was taken.

The tests were run under field conditions, and certain errors with respect to sampling and other evaluation parameters in certain instances were not entirely correct. Most importantly is that it is obvious from Table I that skimmer efficiency generally increased from the first through the fifth day because of treatment application in accordance with the invention.

These results illustrate the substantial increase in the recovery of tall oil soap from Kraft black liquor. It has been shown that by treating the liquor prior to the skimming tank with 100 ppm of the appropriate solution the amount of tall oil soap recovered has been increased from about 20% to about 63%.

What I claim and desire to have protected by Letters Patent is:

1. A method for the separation of tall oil soaps from Kraft black liquor in the manufacture of paper pulp which comprises the steps of:
   A. Treating said Kraft black liquor with an aqueous solution of sodium lignosulfonate containing sodium hydroxide;
   B. Rendering said tall oil soaps insoluble; and
   C. Removing said insoluble tall oil soaps by skimming.

2. The method of claim 1 wherein said aqueous solution of sodium lignosulfonate containing sodium hydroxide has a composition ranging from 10 to 50% by weight sodium lignosulfonate, 10 to 20% by weight sodium hydroxide, and 40 to 75% by weight water.

3. The method of claim 1 wherein said aqueous solution of sodium lignosulfonate containing sodium hydroxide has the composition of 40% by weight of sodium lignosulfonate, 10% by weight of sodium hydroxide and 50% by weight of water.

4. The method of claim 1 wherein said tall oil soaps are present in said Kraft black liquor in a concentration of from 1.0 to 8.0% by weight of solids in said Kraft black liquor.

5. The method of claim 1 wherein the concentration of tall oil soaps ranges from 1.0 to 6.0% by weight of solids in said Kraft black liquor.

6. The method of claim 1 wherein the concentration of tall oil soaps ranges from 1.0 to 4.0% by weight of solids in said kraft black liquor.

7. The method of claim 1 wherein the amount of said aqueous solution of sodium lignosulfonate containing sodium hydroxide used to treat the kraft black liquor ranges from 5 to 1000 parts per million.

8. The method of claim 1 wherein the amount of said aqueous solution of sodium lignosulfonate containing sodium hydroxide used to treat the kraft liquor ranges from 25 to 200 parts per million.

9. A method for the separation of tall oil soaps from kraft black liquor in the manufacture of paper which comprises:
  A. Treating said kraft black liquor with an aqueous solution of sodium lignosulfonate containing sodium hydroxide and a low molecular weight polyacrylate;
  B. Rendering the tall oil soaps insoluble; and
  C. Removing said insoluble tall oil soaps by skimming.

10. The method of claim 9 wherein said aqueous solution of sodium lignosulfonate containing sodium hydroxide and a low molecular weight polyacrylate has a composition ranging from: 10 to 40% by weight of sodium lignosulfonate, 1 to 20% by weight of sodium hydroxide, 1.0 to 15% by weight of a low molecular weight polyacrylate and 25 to 80% by weight water.

11. The method of claim 9 wherein said aqueous solution of sodium lignosulfonate containing sodium hydroxide and a low molecular weight polyacrylate has the composition of 30% by weight of sodium lignosulfonate, 5% by weight of sodium hydroxide, 6% by weight of a low molecular weight polyacrylate and 59% by weight water.

12. The method of claim 9 wherein the tall oil soaps are present in said kraft black liquor in a concentration of from 1.0 to 8.0% by weight of solids in said kraft black liquor.

13. The method of claim 9 wherein the concentration of tall oil soaps ranges from 1.0 to 6% by weight of solids in said kraft black liquor.

14. The method of claim 9 wherein the concentration of tall oil soaps ranges from 1.0 to 4.0% by weight of solids in said kraft black liquor.

15. The method of claim 9 wherein the amount of said aqueous solution of sodium lignosulfonate containing sodium hydroxide and low molecular weight polyacrylate used to treat the kraft black liquor ranges from 5 to 1000 parts per million.

16. The method of claim 9 wherein the amount of said aqueous solution of sodium lignosulfonate containing sodium hydroxide and low molecular weight polyacrylate used to treat the kraft black liquor ranges from 25 to 200 parts per million.

17. The method of claim 9 wherein the molecular weight of said polyacrylate ranges from 5,000 to 20,000.

18. The method of claim 9 wherein said low molecular weight polyacrylate is a homopolymer of acrylic acid.

19. The method of claim 9 wherein the polyacrylate is a homopolymer of methacrylic acid.

20. The method of claim 9 wherein the polyacrylate is a copolymer of acrylic acid and methacrylic acid.

21. The method of claim 20 wherein the polyacrylate is a copolymer of acrylic acid and methacrylic acid in a molar ratio of from 5:1 to 1:5.

22. The method of claim 21 wherein the molar ratio of acrylic acid to methacrylic acid is 3:1.

* * * * *